Oct. 1, 1957   S. B. COHN   2,808,571
ULTRA HIGH FREQUENCY IMPEDANCE MATCHING STUB
Filed Dec. 1, 1954   3 Sheets-Sheet 1

INVENTOR
SEYMOUR B. COHN
BY
ATTORNEY

Oct. 1, 1957 S. B. COHN 2,808,571
ULTRA HIGH FREQUENCY IMPEDANCE MATCHING STUB
Filed Dec. 1, 1954 3 Sheets-Sheet 2

INVENTOR
SEYMOUR B. COHN
BY
ATTORNEY

Oct. 1, 1957  S. B. COHN  2,808,571
ULTRA HIGH FREQUENCY IMPEDANCE MATCHING STUB
Filed Dec. 1, 1954  3 Sheets-Sheet 3
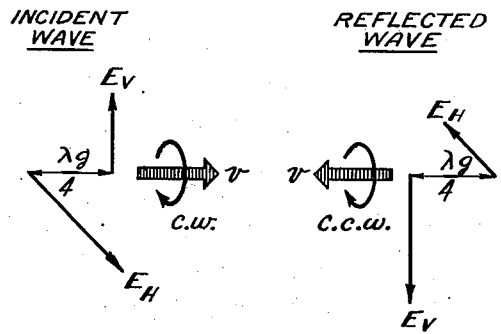
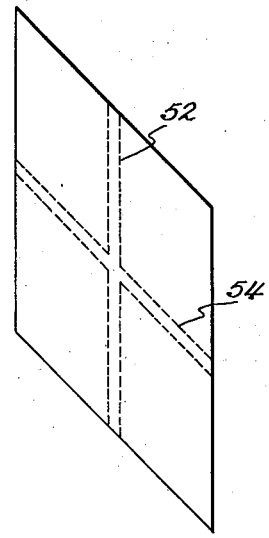
Fig-7-
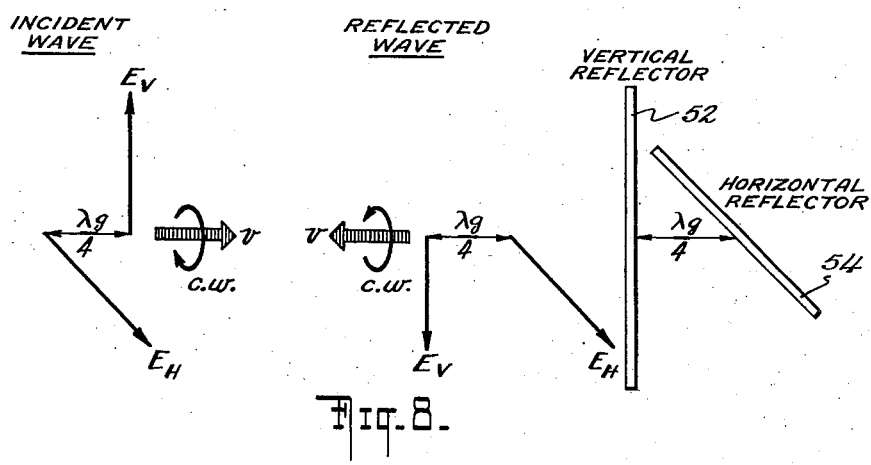
Fig-8-
INVENTOR
SEYMOUR B. COHN
BY
ATTORNEY //
United States Patent Office 2,808,571
Patented Oct. 1, 1957

2,808,571

ULTRA HIGH FREQUENCY IMPEDANCE MATCHING STUB

Seymour B. Cohn, Palo Alto, Calif., assignor to Sperry Rand Corporation, a corporation of Delaware Application December 1, 1954, Serial No. 472,476

4 Claims. (Cl. 333—33)

This invention relates to ultra high frequency apparatus, and more particularly, is concerned with apparatus for use in a microwave transmission line to introduce any selected phase shift, attenuation, or shunt susceptance in the line.

In copending application, Serial No. 472,475, filed December 1, 1954, by Seymour B. Cohn, there is described a hybrid junction which involves the coupling of the end of a circular wave guide to the broad wall of a rectangular wave guide. By suitable coupling means therein described, all of the energy transmitted in the dominant mode in one direction in the rectangular wave guide is coupled into the circular wave guide as a circularly polarized wave. The direction of propagation in the rectangular wave guide was shown to determine the direction of rotation of the circularly polarized wave in the circular wave guide, and vice versa, the direction of rotation of a circularly polarized wave incident at the coupler was shown to determine the direction of propagation in the rectangular wave guide.

It is a general object of this invention to utilize the coupler of the above-identified application to provide improved apparatus for use in a microwave transmission line to introduce, according to the several modifications of the invention, any desired amount of phase shift, attenuation, and/or impedance in the line.

Another object of this invention is the provision of microwave apparatus which can be utilized as a linearly adjustable phase shifter.

Another object of this invention is to provide phase shifting apparatus for a microwave transmission line capable of operating at relatively high power with negligible loss.

Another object of this invention is the provision of microwave apparatus which may be utilized as a variable attenuator.

Another object of this invention is to provide microwave apparatus for matching any load to a microwave transmission line.

Another object of this invention is the provision of an adjustable matching transformer in which both the magnitude and angle of the reflection coefficient may be independently adjusted.

These and other objects of the invention which will become apparent as the description proceeds are achieved by the provision of apparatus including a section of rectangular wave guide and a section of circular wave guide, the latter being joined at one end to a broad wall of rectangular wave guide to form a T-junction. Coupling means is provided in the broad wall of the rectangular wave guide for coupling all of the energy propagated in one direction in the rectangular wave guide to the circular wave guide, the coupling means launching circularly polarized energy in the circular wave guide. An adjustable short-circuiting plunger is provided in the circular wave guide for reflecting all the incident energy. The short-circuiting means in the preferred form of the invention comprises two conductive elements in the form of plates that extend substantially at right angles to each other and diametrically across the circular wave guide. The elements have conductive edges which reflect the two components of the circularly polarized wave. The rotation or longitudinal movement of the reflecting means in the circular wave guide results in a shift in phase of the reflected energy. Relative movement between the two reflecting edges controls the division of power of the energy reflected back toward the source and the energy transmitted on to the load. By lining the walls of the circular wave guide with attenuating material the amount of energy which is reflected by the short-circuiting means may be varied to provide a variable attenuator.

For a better understanding of the invention reference should be had to the accompanying drawings, wherein:

Figs. 7 and 8 are diagrammatic views useful in explaining the mode of operation of the invention.

Figure 1:
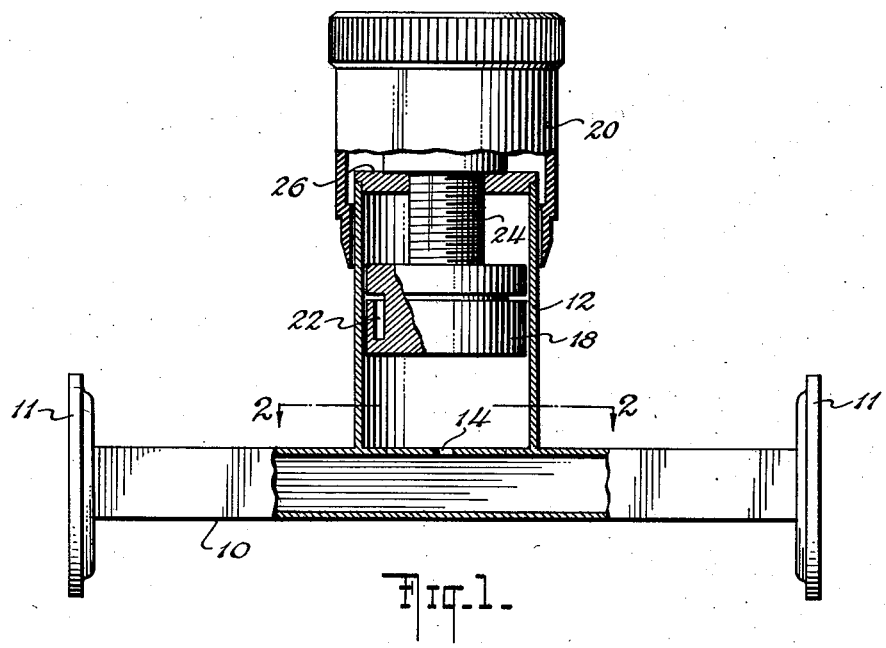
Fig. 1 is an elevational view, partly in section, of the apparatus used as a phase shifting device.
Figure 2:
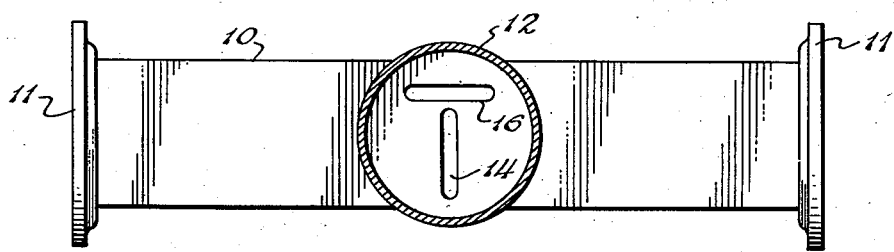
Fig. 2 is a sectional view taken substantially on the line 2—2 of Fig. 1.

Referring to the embodiment of Figs. 1 and 2, the numeral 10 indicates generally a section of rectangular wave guide designed to propagate energy in the TE$_{10}$ mode at a desired frequency of $f_0$. Each end of the wave guide section 10 is provided with a coupling flange 11 for coupling into a wave guide transmission line. Joined at right angles to one of the broad walls of the rectangular wave guide 10 is a section of circular wave guide 12, the two wave guide sections 10 and 12 being joined so that their longitudinal axes intersect at right angles to each other. Coupling is provided between the two wave guide sections by means of a pair of slots 14 and 16. The slot 14 extends longitudinally in a direction transverse to the axis of the wave guide 10 with its center position substantially along the longitudinal axis of the circular wave guide 12. The slot 16 in turn is positioned parallel to and adjacent one of the narrow walls of the rectangular wave guide section 10 and to one side of the slot 14, the slot 16 having a center substantially along the longitudinal axis of the slot 14, to form a T-configuration, as shown.

With the slot 14 providing coupling to the transverse electric currents in the wave guide section 10 and with the slot 16 providing coupling to the longitudinal currents in the wave guide 10, it has been found that two waves are launched in the circular wave guide 12, each propagated in the TE$_{11}$ mode with the electric vectors in space and time quadrature. By definition such waves, providing they are equal in amplitude, may be considered components of a single circularly polarized wave. As pointed out in the above-mentioned copending application, the direction of propagation in the rectangular wave guide 10 determines the direction of rotation of the circularly polarized wave launched in the circular wave guide 12. By adjusting the length of the coupling slots so that they are both resonant at the operating frequency $f_0$, that is, when their lengths are substantially equal to a half wavelength, 100% power transfer from the rectangular wave guide to the circular wave guide at the coupling slots can be effected.

Positioned within the circular wave guide 12 is a movable piston 18. Calibrated means are provided for effecting gradual longitudinal movement of the piston 18, and for accurately noting the position thereof. Such means may comprise a screw drive mechanism, including a large diameter micrometer thimble 20 provided with a scale of divisions around the end thereof, the circular wave guide section 12 being provided with an index mark therefor and with a longitudinal scale of divisions to be referred along with the angular divisions in the manner of the calibration system ordinarily employed for micrometers. The piston 18 is provided with a slot to form a quarter wavelength wave trap, indicated at 22, which serves to provide an extremely low effective impedance value across the gap at the periphery of the face of the piston, in the manner particularly taught in U. S. patent application S. N. 102,276, filed June 30, 1949, in the names of E. L. Ginzton and F. L. Salisbury. The thimble 20 and piston 18 are joined by a micrometer screw 24 which threadedly engages an end plate 26 secured around its periphery to the upper end of the circular wave guide section 12.

The apparatus of Figs. 1 and 2 as above described is particularly useful as a phase shifter for shifting the phase of energy propagated along the wave guide 10. Its mode of operation can best be understood by reference to Fig. 7. Energy traveling down the wave guide 10, on reaching the coupling slots, is entirely coupled into the circular wave guide, launching a circularly polarized wave therein. The direction of rotation of the circularly polarized wave, as heretofore pointed out in the above-mentioned copending application, depends on the particular slot configuration and on the direction in which the energy is traveling in the rectangular wave guide 10. Assuming energy is propagated from left to right in the rectangular wave guide 10 of Fig. 1, an incident wave is launched in the circular wave guide 12 having a clockwise direction of rotation as viewed from behind. This is shown diagrammatically in Fig. 7 by the heavy arrow respresenting the incident wave. As this incident wave strikes the reflecting surface of the piston 18, a reflected wave is launched which is circularly polarized but has a direction of rotation that is counterclockwise looking in the direction of propagation of the reflected wave. The reflecting plane reverses the direction of rotation of the circularly polarized wave reflected back on the circular wave guide, resulting in the reflected wave being coupled back into the rectangular wave guide 10 in a direction to the right, as viewed in Fig. 1. This is the same direction in which the input wave of the rectangular wave guide is propagated. The phase of the output wave in the rectangular wave guide 10 relative to the input wave is therefore determined by the path length within the circular wave guide 12. Any change in the position of the piston 18 changes the path length and hence the phase at the output end of the rectangular wave guide 10 by a proportional amount.

Figure 3:
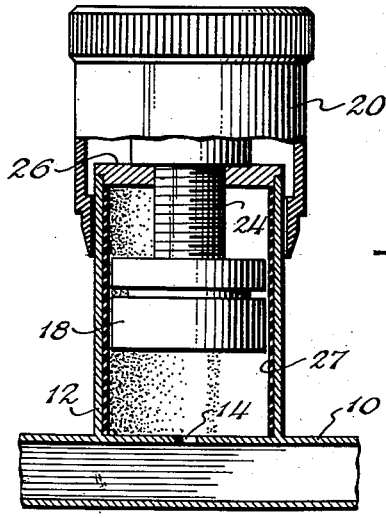
Fig. 3 is a partial view, partly in section, of a modification of the invention for use as a variable attenuator.

Referring to Fig. 3, there is shown a modification of the above-described apparatus in which the circular wave guide 12 is lined with a layer 27 of microwave energy absorbing material such as polyiron, graphite, or a semiconducting metal. By adjusting the piston 18 and changing the path length within the circular wave guide 12, the amount of energy dissipated by the attenuating layer may be varied. Of course the amount of attenuation can readily be reduced to zero by extending the piston against the face of the rectangular wave guide.

Figure 4:
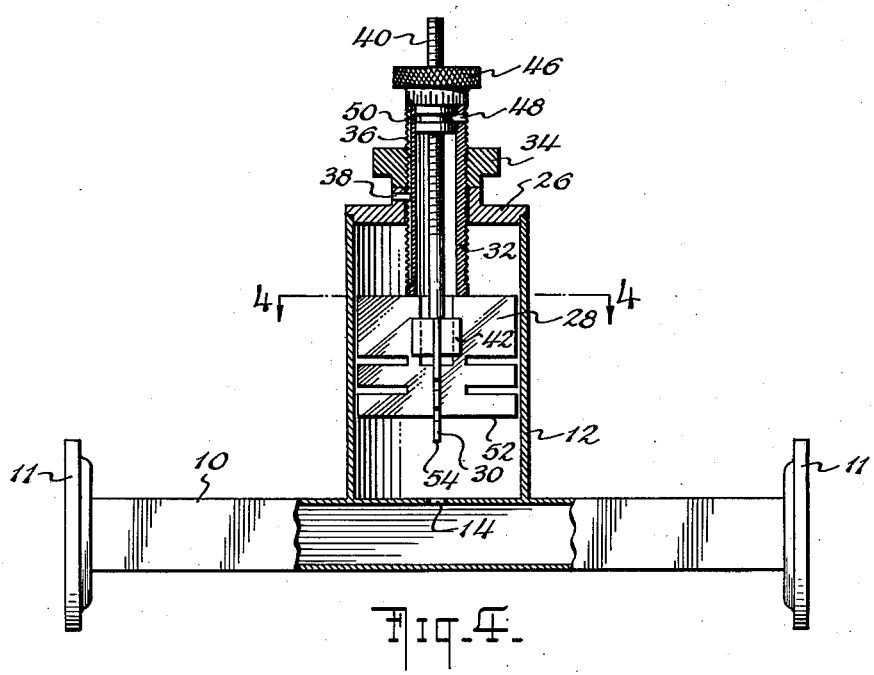
Fig. 4 is an elevational view, partly in section, of a modification of the invention useful as an impedance matching device.
Figure 5:
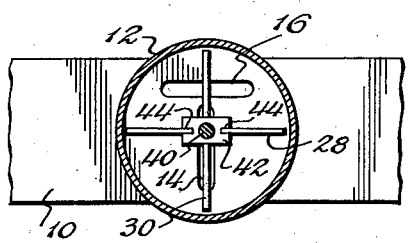
Fig. 5 is a sectional view taken substantially on the line 5—5 of Fig. 4.

A further modification of the invention, useful as an impedance matching transformer, is shown in Figs. 4 and 5. In this modification, the solid piston is replaced by reflecting means consisting of two conductive plates 28 and 30 which extend diametrically across the circular wave guide at right angles to each other. The plate 28 is secured at its upper edge to a hollow shaft 32 which extends through a sleeve portion of the end plate 26 and is threadedly engaged by an adjusting nut 34. The shaft 32 is provided with a key slot 36 engaged by a pin 38 to prevent the shaft 36 from rotating. Thus rotation of the adjusting nut 34 provides a longitudinal displacement of the plate 28 within the circular wave guide 12.

The second plate 30 is made relatively movable with respect to the plate 28 and is secured at its upper end to a stud member 40. A guide block 42 is provided with slots 44 engaging the conductive member 28 for guiding the member 28 for relative longitudinal movement without relative rotational movement.

The upper end of the stud member 40 threadedly engages an adjusting nut 46 which is journalled in the hollow shaft 32. A pin 48 secured to the wall of the shaft 32 engages a groove in the adjusting nut 46 to permit rotation of the nut 46 while maintaining it in position in the end of the shaft 32. Thus, rotation of the adjusting nut 46 provides relative longitudinal movement between the two conductive plates 28 and 30. Both the plates 28 and 30 are provided with quarter wavelength slots to reduce their shunt impedance at their lower reflecting edges.

Referring again to Fig. 7 and Fig. 8, if the lower reflecting edges of the conductive plates 28 and 30, as indicated at 52 and 54, respectively, are adjusted so as to lie in the same transverse plane, they will reflect the two components of the circularly polarized wave in the same manner as the solid piston of the phase shifter described above. As a result, as shown in Fig. 7, the reflected wave will have the reverse direction of rotation from the incident wave, so that all the energy is coupled back into the rectangular wave guide in the direction of the output or load end. If the plates 28 and 30 are adjusted so that their lower edges 52 and 54 are displaced by a quarter wavelength, then, as shown in Fig. 8, the reflected wave will have the same direction of rotation as the incident wave, so that all the energy is then reflected back toward the input or source end of the rectangular wave guide 10. By adjustment of the two conductive members 28 and 30, so as to move the reflecting edges 52 and 54 between these two extreme conditions, the proportion of energy reflected back toward the input or source end of the wave guide 10 can be adjusted between zero and 100%. Thus, it will be seen that the coupler and associated reflecting plates 28 and 30 behave as a two terminal-pair device in which the absolute magnitude of the input reflection coefficient may be varied between zero and one when its output terminals see a reflectionless load.

Furthermore, by moving the conductive plates 28 and 30 together as a unit, as by the adjusting nut 34, the phase angle of the reflected wave can be adjusted. Since both the magnitude and phase of the reflection coefficient of the device can be independently adjusted, any load impedance can be matched by the above-described apparatus.

Figure 6:
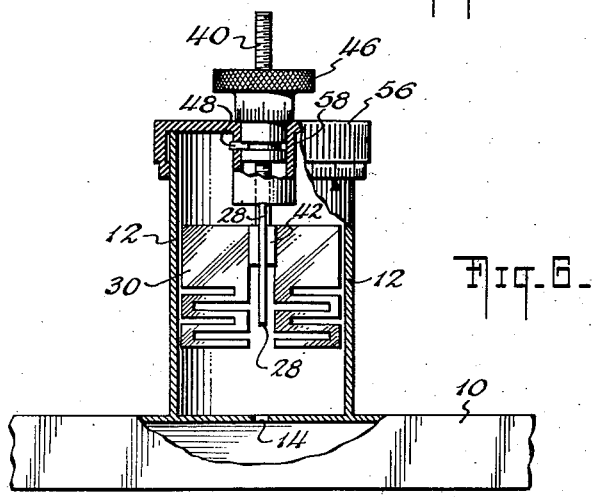
Fig. 6 is a partial view, partly in section, of a modification of the impedance matching apparatus of Fig. 4.

In a modified form of the impedance transformer of Fig. 4, as illustrated in Fig. 6, the phase angle of the reflection coefficient is varied by rotating the conductive plates 28 and 30. In this case a cap 56 is provided which fits over the end of the circular wave guide 12 that is rotatable thereon. The cap 56 is provided with a hollow sleeve portion 58, the lower end of which is fastened to the conductive plate 28. Relative movement between the conductive plate 28 and the plate 30 is provided in the same manner as in the modification of Fig. 4. A calibrated scale is provided on the lower outer edge of the cap 56 for indicating the angular position of the plates 28 and 30 within the circular wave guide 12. Thus, as in the apparatus of Fig. 4, the apparatus of Fig. 8 acts as a shunt susceptance which can be adjusted to match any load to the rectangular wave guide 10. The reflection coefficient of the shunt susceptance is varied in magnitude by adjustment of the nut 46 and in phase by rotation of cap 56.

From the above description it will be seen that the various objects of the invention have been achieved by the provision of microwave apparatus which can be inserted in a rectangular wave guide transmission line for use as a phase shifter, an attenuator, or an impedance matching transformer. As a matching transformer it acts as a variable two-terminal-pair junction in which both the phase angle and magnitude of the reflection coefficient can be independently varied.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. An adjustable impedance matching device comprising a section of rectangular wave guide, a section of circular wave guide joined at one end to a wall of the rectangular wave guide, coupling means including slots in the portion of wall of the rectangular wave guide at the end of the circular wave guide section, the slots being oriented to excite a circular polarized energy wave in the circular wave guide section from energy propagated in the rectangular wave guide section, and adjustable short-circuiting means in the circular wave guide section including first and second conductive elements extending diametrically across the circular wave guide in substantially perpendicular relationship to each other, means for adjustably positioning one element relative to the other element in a direction parallel to the longitudinal axis of the circular wave guide section, and means for adjustably positioning said elements as a unit within the circular wave guide in a direction parallel to the longitudinal axis of the circular wave guide.

2. An adjustable impedance matching device comprising a section of rectangular wave guide, a section of circular wave guide joined at one end to a wall of the rectangular wave guide, coupling means at the end of the circular wave guide section for exciting a circular polarized energy wave in the circular wave guide section from energy propagated in the rectangular wave guide section, and adjustable short-circuiting means in the circular wave guide section including first and second conductive elements extending diametrically across the circular wave guide in substantially perpendicular relationship to each other, and means for adjustably positioning one element relative to the other element in a direction parallel to the longitudinal axis of the circular wave guide section.

3. Apparatus as defined in claim 2 further including means for rotating the elements as a unit about the longitudinal axis of the circular wave guide.

4. Apparatus as defined in claim 2, wherein said adjustable short circuiting means further includes means for adjustably positioning said elements as a unit within the circular wave guide in a direction parallel to the longitudinal axis of the circular wave guide.

References Cited in the file of this patent

UNITED STATES PATENTS

| | | |
|---|---|---|
| 2,642,494 | Zaslavsky | June 16, 1953 |
| 2,686,901 | Dicke | Aug. 17, 1954 |
| 2,714,707 | Zabel | Aug. 2, 1955 |

FOREIGN PATENTS

| | | |
|---|---|---|
| 592,224 | Great Britain | Sept. 11, 1947 |